Fig.1.

INVENTOR.
THOMAS MALDWYN LEWIS

Fig. 1a.

INVENTOR.
THOMAS MALDWYN LEWIS

March 13, 1962 T. M. LEWIS 3,024,639
APPARATUS FOR PROCESSING HIDES AND SKINS
Filed Jan. 29, 1960 8 Sheets-Sheet 3

*Fig. 2.*

INVENTOR.
THOMAS MALDWYN LEWIS
BY

March 13, 1962 T. M. LEWIS 3,024,639
APPARATUS FOR PROCESSING HIDES AND SKINS
Filed Jan. 29, 1960 8 Sheets-Sheet 4

INVENTOR.
THOMAS MALDWYN LEWIS
BY

INVENTOR.
THOMAS MALDWYN LEWIS

March 13, 1962 T. M. LEWIS 3,024,639
APPARATUS FOR PROCESSING HIDES AND SKINS
Filed Jan. 29, 1960 8 Sheets-Sheet 8

*Fig.11.*

DIAGRAM SHOWING ACTUAL POSITIONS OF SWITCHES 61 & 63 RELATIVE TO GEAR LEVER 56

*Fig.12.*

INVENTOR.
THOMAS MALDWYN LEWIS
BY

United States Patent Office 3,024,639
Patented Mar. 13, 1962

3,024,639
APPARATUS FOR PROCESSING HIDES AND SKINS
Thomas Maldwyn Lewis, Great Eversden, Cambridge, England, assignor to National Research Development Corporation, London, England
Filed Jan. 29, 1960, Ser. No. 5,407
Claims priority, application Great Britain Jan. 30, 1959
6 Claims. (Cl. 69—42)

This invention has reference to apparatus for processing hides and skins, hereafter referred to as hides.

Heretofore in the processing of hides for the removal therefrom of hair and adhering flesh in their preparation for tanning it has been the usual practice to remove the hair and the flesh by separate operations. In each operation the hide is introduced into an appropriate machine and one half thereof processed as it is ejected therefrom. The hide is again introduced into the machine but this time with the erstwhile trailing edge leading so that the other half of the hide is likewise processed as the hide is ejected. The hair or flesh removing machine thus operates over the whole area of the hide but it will be noted that each operation necessitates that the hide be twice fed into the machine. This manipulation of the hide must be done manually. Such double manual operation is necessary both in removing the hair and in removing the flesh from the hide.

One object of the invention is to provide an apparatus whereby each of the aforesaid operations, either separately or in sequence, can be effected without manhandling of the hides.

The invention is, however, not restricted to an apparatus by which the aforesaid operations are effected, but is applicable to the processing of hides at any stage up to the processing of the finished leather.

According to the present invention an apparatus for processing hides comprises an endless conveyor, a series of transverse hide supporting rods supported by said conveyor, clamping means for securing the edge of a hide to each rod in turn and at least one processing station positioned below the conveyor, each station comprising upper and lower feed rollers, means for intermittently driving the rollers in opposite directions, means for opening the rollers to permit each rod in turn to pass therebetween and means for processing the hides at each side of the rollers. The arrangement and construction is such that a hide can be clamped to each rod in turn, each rod with hide clamped thereto carried forwardly between the rollers of the processing station, which rollers are then closed, the leading edge of the hide released and the rollers driven to feed the hide backwards, the leading half of the material being then processed, and thereafter the drive of the rollers reversed, the other half of the hide processed and the leading edge of the hide or the like again clamped to the said rod so that the hide is again fed forwards by the conveyor to a further processing station or to a delivery station.

The invention further consists in an apparatus as set forth in the preceding paragraph whereby each hide supporting rod is carried by a frame extending transversely of and secured to the conveyor so as to be capable of a swivelling movement and wherein guide means are provided to swivel the frames so that the hide supporting rod of each frame in turn is positioned to receive the leading edge of a hide at the feed end of the machine and also at the processing station or stations and guided to pass between the rollers of the station or stations.

The invention further consists in an apparatus as set forth in either of the preceding paragraphs provided with rails to receive a hide frame from which the hides are suspended, means to feed the frame forward step by step and means to disconnect the leading hide preparatory to it being clamped to a hide supporting rod.

The apparatus may be provided at its feed end with a roller which can be operated to bear on the leading suspended hide so that when the hide is released from the hide frame it is draped over the roller to be supported thereby in such position that its leading edge can be clamped to a hide supporting rod.

A preferred embodiment of the invention will now be described with reference to the accompanying drawings wherein:

FIGURES, 8 and 9 show a plan view and elevation of part of a chain;

FIGURE 10 is a view to a larger scale of the means for conveying the hides through the apparatus;

Figure 7:
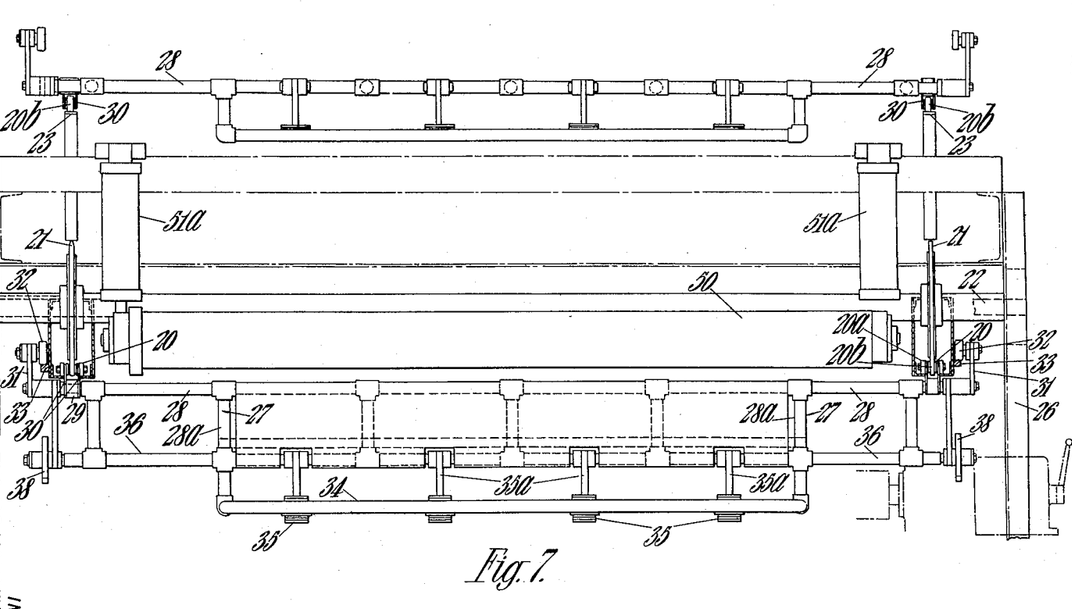
FIGURE 7 is a section on the line 7—7 of FIGURE 1.
Figure 8:
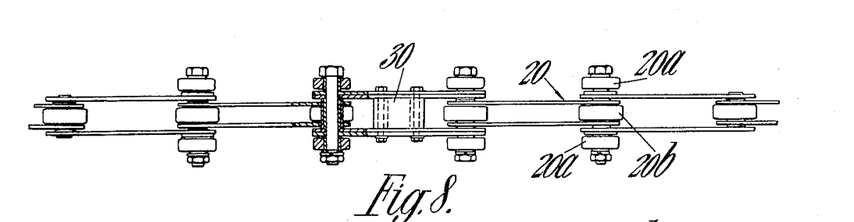

The apparatus shown in the drawings, which is for removing hair and flesh from hides being prepared for tanning, is provided with an endless conveyor in the form of two endless chains 20 trained over sprocket wheels 21 mounted on transverse shafts 22. The conveyor has a basic counter-clockwise movement as viewed in FIGURE 1 with intermittent clockwise movements as tahe hides advance through the machine. Each link of the chain is provided with outer rollers 20a and an inner roller 20b, see FIGURE 7, and the upper runs of the chains are supported by guide tracks 23 on which run the inner rollers while the lower runs are supported by guide tracks 24 on which run the outer rollers. The shafts 22 are supported in bearings 25 provided on a suitable supporting structure 26. At regularly spaced distances apart the conveyor carries a series of transversely extending conveyor frames 27. Each frame is fast on a transverse spindle 28 journalled in bearings 29 provided in brackets 30 projecting from the links of the chains, see FIGURE 9, the frame being capable of swivelling about the axis of said spindle. It will be noted that the lower tracks are formed with a central gap through which pass the brackets 30. To each end of each spindle 28 is secured an arm 31 provided at its free end with a roller 32 arranged to co-operate with a track.

Each track 24 is provided with upper and lower inclined plates 33 and 33a positioned at the feed end of the apparatus, a horizontally extending part 33b downwardly inclined at its leading end and terminating at a gap 33c located beyond a station A, a further horizontally extending portion 33d terminating at a gap 33e located beyond a station B, a slightly downwardly inclined portion 33f and a further downwardly inclined portion 33g at the delivery end. In the gap 33c is an abutment 33h and in the gap 33e is an abutment 33i.

At the side of the gap 33c nearer the feed end is a switch 1A and on the other side of said gap is a switch 1C on a short upwardly inclined track portion 33j. Carried by the abutment 33h are switches 2A and 2B. Carried by the horizontal portion 33d of the track and located near the gap 35 is a further switch 1B.

Figures 9, 10:
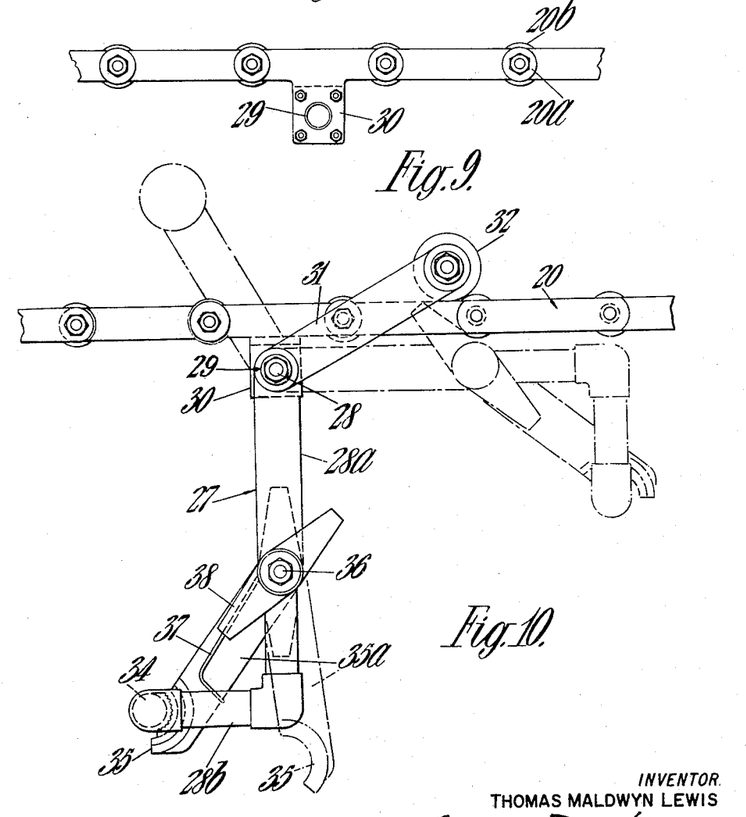

Fast on each spindle 28 is a series of radially extending parallel arms 28a, see particularly FIGURE 10, with right angled extensions 28b. The extensions carry a transversely extending hide supporting rod 34. To co-operate with each rod is a series of clamps 35, see FIGURE 7, carried by arms 35a fast on a second transverse spindle 36 of each frame, spring means 37, see FIGURE 10, biasing the clamps towards their co-operating rod 34. The second spindle 36 at each end thereof has fast thereon a double arm lever 38 arranged to co-operate with fixed stops 39, 39a, 39b, 39c, 39d and 39e so that the clamps can be moved against their spring biasing. In FIGURE 10 the lever and clamps are shown in its normal position in full lines, and are shown in dotted lines in their position when the lever co-operates with a stop.

Figure 1:
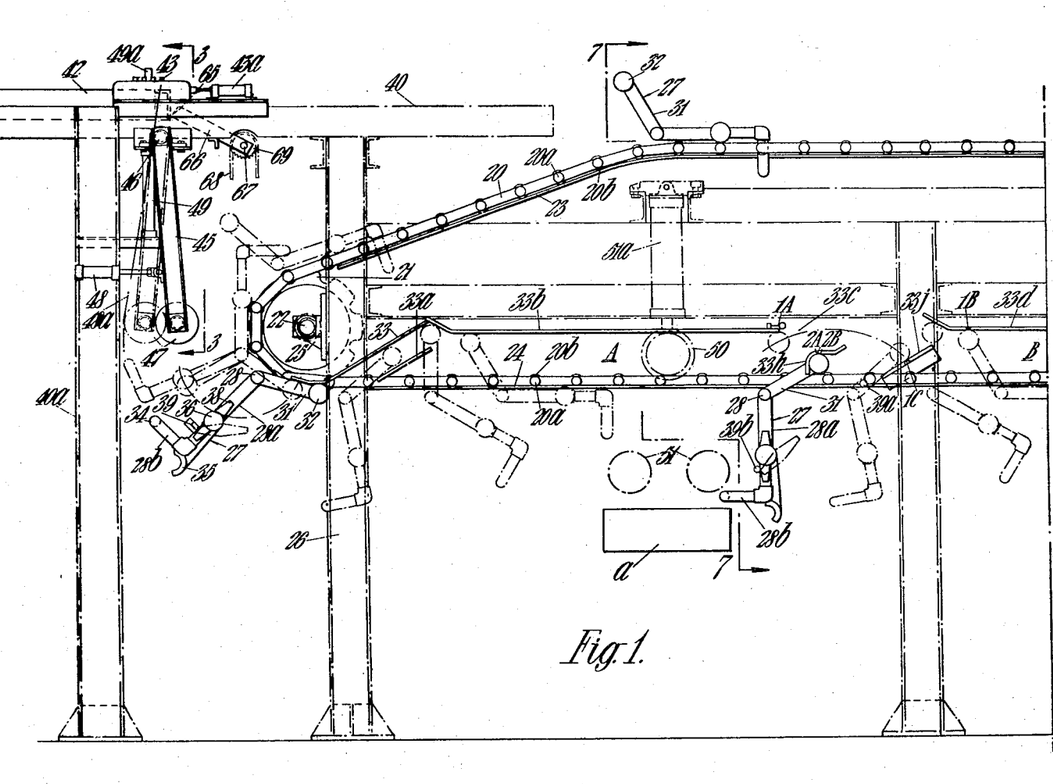
FIGURE 1 is an elevation, partly in section, of the left hand end of the apparatus showing the feed end thereof and one processing station.
Figure 2:
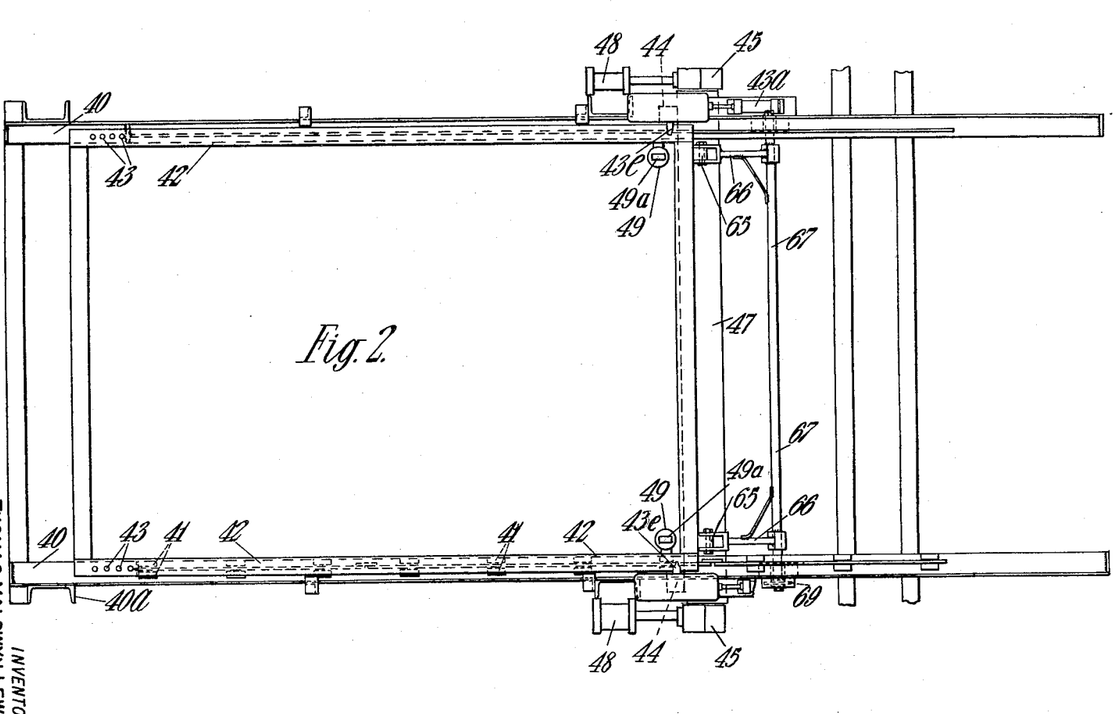
FIGURE 2 is a plan view of the hide frame positioned at the feed end of the apparatus together with its supporting structure and means by which the frame is advanced step by step.
Figure 3:
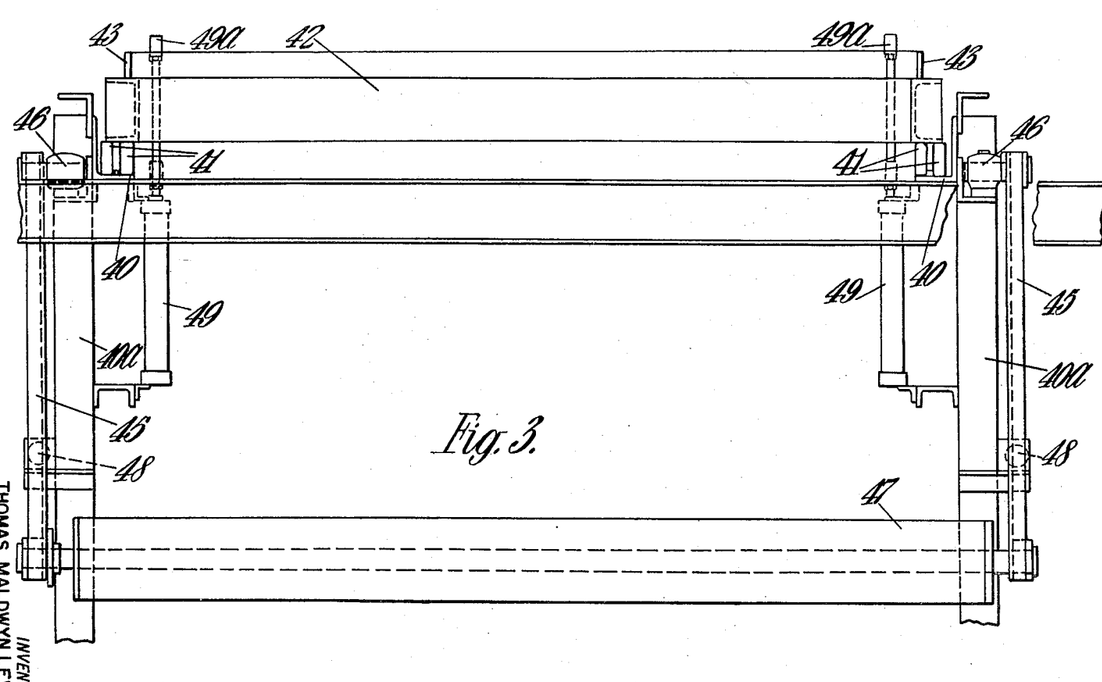
FIGURE 3 is a section on the line 3—3 of FIGURE 1 looking to the left.

At the feed end of the apparatus are rails 40, see FIGURES 1, 2 and 3, with rollers 41 to support a hide frame 42, the rails being supported by a frame structure 40a. Each side of the hide frame is provided with a series of upwardly extending pins 43 and the hides have holes punched therein to receive the pins. In this manner the hides can be suspended one behind the other. The hides are so secured to the hide frame prior to being processed and the said frame is placed on the rollers 41.

Figures 4, 6:
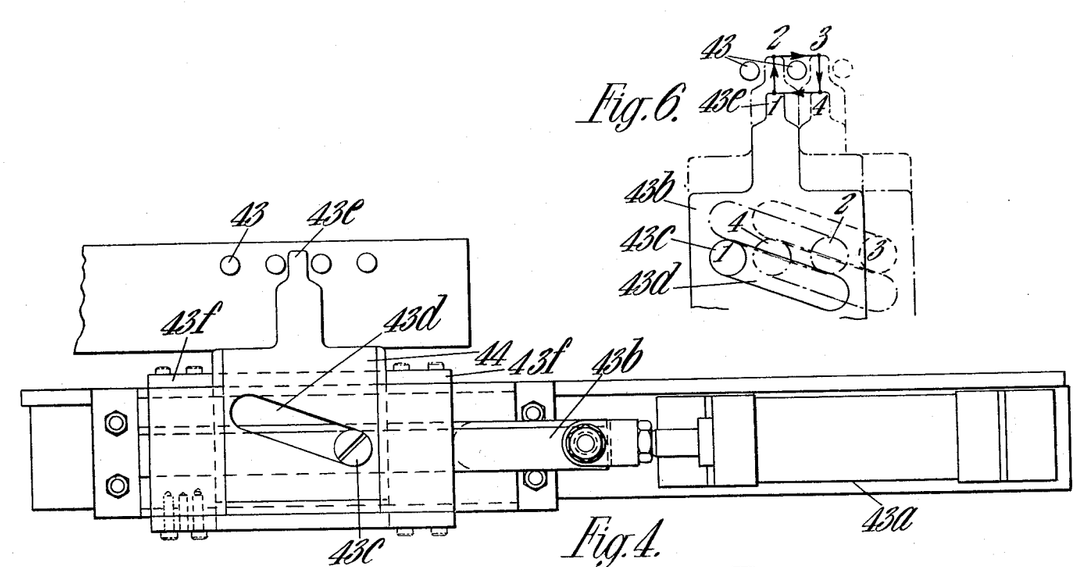
FIGURE 4 is a plan view of the means for indexing the hide frame step by step.
FIGURE 6 shows diagrammatically the action of the indexing means shown in FIGURES 4 and 5.
Figure 5:
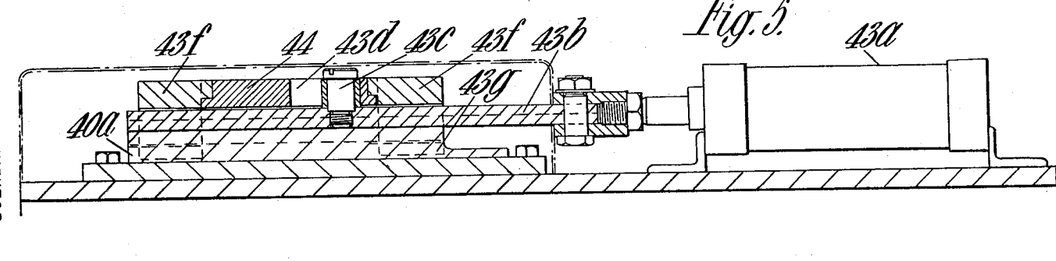
FIGURE 5 is a sectional elevation of FIGURE 4.

Also at the feed end of the machine are pneumatically operated or other feed means whereby the frame can be fed forwards step by step. Such pneumatically operated means comprises pneumatic piston and cylinder assemblies 43a in combination with horizontally sliding plates 44 operated thereby. The piston of each of said assemblies is secured to a flat bar 43b, see FIGURES 4 and 5, which carries a pin or roller 43c fitting into a slot 43d in the plate, the slot being inclined to the axis of the assembly. Each plate is formed with a finger 43e which is arranged to fit between adjacent pins 43. The plates are slidable in transverse guides 43f which can slide on a base 43g attached to the frame 40a. When each piston is moved outwards the pin 43c and finger 43e are in the positions indicated in full lines in FIGURE 6, and indicated thereon by the numeral 1. When the piston is moved to the right so that the pin 43c occupies the position indicated by the numeral 2 in FIGURE 6 the plate is moved transversely so that its finger enters between the pins 43, the position thereof being also indicated by the numeral 2. The inclination of the slots 43d is such that the pins 43c always tend to move the plates towards the pins 43 prior to moving the plates longitudinally of the machine. At the end of the inward movement of the piston the pin 43c is in the position indicated by the numeral 3 and the plate together with the hide frame has been indexed one step to the right, the finger now being in the position likewise indicated by the numeral 3. Movement of the piston so that the pin 43c occupies the position indicated by the numeral 4 results in the plate being moved to withdraw the finger from the pins, the finger being in the position likewise indicated by the numeral 4 and further movement of the piston results in the pin and the finger being moved to their initial positions.

Further, as shown in FIGURE 1, there is suspended at the feed end of the frame 40a by means of a pair of side arms 45 pivoted at 46 a hide receiving roller 47 which extends transversely of the machine. Pneumatically operated piston and cylinder assemblies 48 are provided by which said roller can be forced against the foremost hide suspended from the hide frame and thereafter retracted, said hide being designated 48a. In addition there is provided at the feed end of the machine, see FIGURES 1 and 2, pneumatic piston and cylinder assemblies 49, the pistons having hide engaging heads 49a to engage with the leading hide and thereby raise and disengage it from its supporting pins.

Located between the two ends of the conveyors are the two processing stations A and B each consisting of a group of upper and lower rollers. In the drawings each group is shown comprising an upper roller 50 and two lower rollers 51. The lower rollers at each station are driven by a motor and the upper roller is driven when lowered. Said rollers are feed rollers. The upper roller of each group is shown provided with an hydraulic piston and cylinder assembly 51a by which it can be raised and lowered, but other suitable means may be provided for this purpose.

The upper rollers are provided at the ends thereof with spur wheels which, when said rollers are lowered, mesh with spur wheels on the ends of the lower rollers.

The hair is removed from the hides at station A by conventional hair removing means a, indicated diagrammatically, and the flesh is removed at station B by flesh removing means b, likewise indicated diagrammatically.

A conventional hair-removing apparatus and also a flesh-removing apparatus embodies essentially a combination of rollers, at least one of which is a hair or flesh removing roller. The rollers are moved apart to permit of the introduction of half of a hide therebetween, and the rollers brought together and driven to remove the hair, or flesh, from that half of the hide. Thereafter the other half of the hide is likewise treated.

Figure 1A:
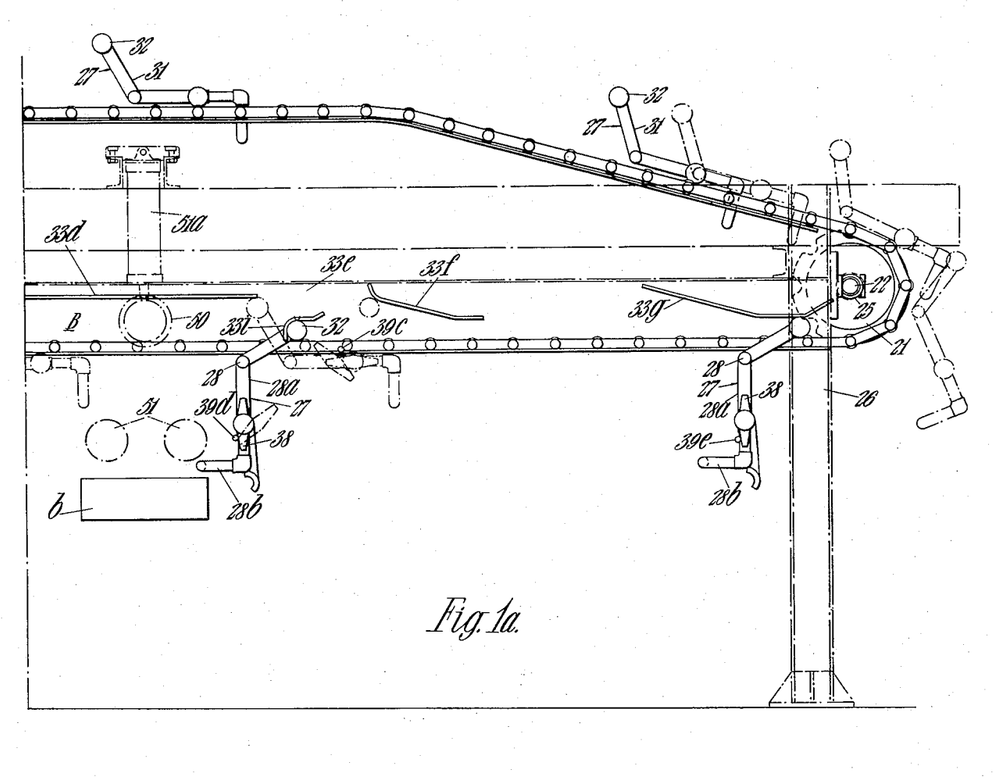
FIGURE 1a is a sectional elevation of the right hand end of the apparatus showing a second processing station and the delivery end of the apparatus.

As shown in FIGURES 1 and 1a the conveyor frames 27 are so spaced apart that when one is in a hide receiving position another is at station A, a third is at station B and a fourth is at the delivery end of the apparatus.

Figure 11:
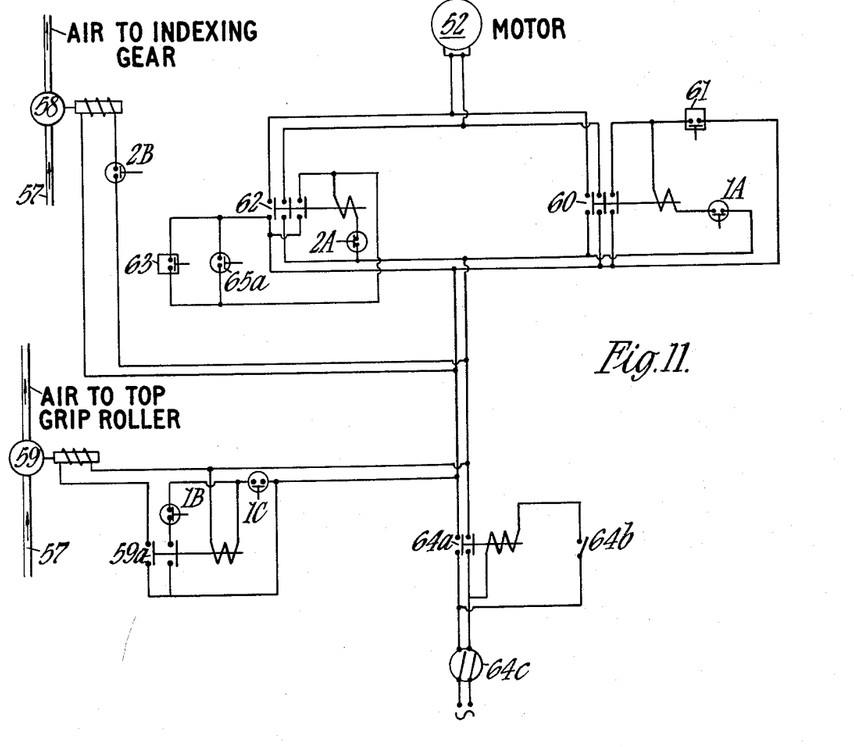
FIGURE 11 shows diagrammatically the means whereby the motor driving the conveyer, the drive from a second motor to the processing stations and pneumatic piston and cylinders are operated in timed sequence.
Figure 12:
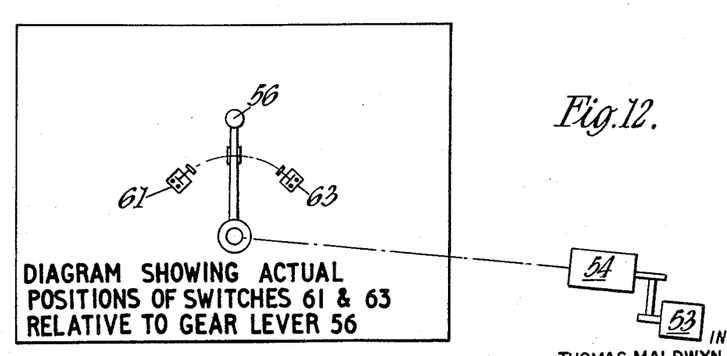
FIGURE 12 shows the second motor, a reversible gear driven thereby, the gear lever operating said gear and time-delay switches included in the circuit shown in FIGURE 11.

Reference will now be made particularly to FIGURES 11 and 12 wherein 52 designates the conveyor motor which is driven as will hereafter be explained, 53 is one of a pair of constantly driven motors, only one being shown, 54 is a reversible gear driven by the motor 53, and which drives the rollers at one processing station, a similar reversible gear, not shown, being provided to drive the rollers at the other processing station. A gear lever 56 controls both reversible gears and therefore the direction of drive of the rollers at both stations.

Compressed air is supplied through an air supply line 57 to two solenoid controlled valves 58 and 59, valve 58 controlling the supply of compressed air to the cylinders of the assemblies 43a, 48 and 49, and valve 59 controlling the supply of compressed air to the cylinders of the assemblies 51a at the processing stations, see FIGURE 1.

When the gear lever 56 is moved to the left as viewed in FIGURE 12 a forward contactor 60 is energised through a time-delay switch 61 to close the circuit of motor 52 which drives the conveyor to carry the hides through the apparatus from the feed to the delivery end. When the gear lever is moved to the opposite position a reverse contactor 62 is energised through a time-delay switch 63 to reverse the motor so that the travel of the conveyor is likewise reversed. The aforesaid operation of the gear lever also controls the two reversing gears 54 through which the drive is transmitted to the rollers 50 and 51 at the two stations.

An immediate reverse conveyor start switch 65a is shown by which the reverse contactor 62 is energised to drive the motor so that the conveyor carries the hides towards the feed end of the machine. This immediate switch is closed only at the commencement of the processing of a batch of hides and is under the control of the operator.

The aforesaid switches 1A, 1C, 2A, 2B and 1B are also shown in this figure and their functions will be understood from the description of the operation of the apparatus.

For motor 52 a main starter 64a is provided which can be closed by the main starter switch 64b and opened by the emergency stop switch 64c.

The part of the hide which is leading when the hide commences its travel through the machine will be referred to as the leading end irrespective of its direction of travel and the other end will be referred to as the trailing end.

It will be assumed that the hide frame 42 with its full complement of hides has been placed on the rollers at 41 at the feed end of the apparatus, the hide frame being correctly located by contact with stops 65 carried by arms 66 fast on a cross spindle 67. When the hide frame is so located the stops 65 are swung clear thereof by giving the spindle a partial rotation. This can be done by means of a chain 68 trained over a sprocket wheel 69 fast on the spindle, the chain having hand grips by which it can be pulled.

The immediate reverse switch 65a is now closed by hand and immediately opened whereon the reverse contactor is energized to close the circuit of the motor 52 which then drives the conveyor so that a frame at the feed end is moved backwards to a hide receiving position as shown in full lines. Simultaneously the preceding conveyor frame is moved so that its rollers 32 contact with the abutments 33h in the gaps 33c and the frame further in front is moved so that its rollers contact with the abutments 33i in the gaps 33e. Towards the end of the reverse movement of the conveyor the levers 38 of the said frame at the feed end contact with the stops 39 and are thereby moved into the positions shown in full lines. Consequently the spindle 36 is given a partial rotation to move the clamps 35 away from the hide supporting rod against their springs.

The reverse movement of the conveyor is stopped by the opening of switch 2A, this switch, which is included in the conveyor motor circuit, being opened by a roller 32 of the frame at station A. Said roller also closes switch 2B in the circuit of the solenoid of valve 58. The energising of this solenoid results in valve 58 being operated to supply compressed air to the cylinders of the assemblies 43a, 48 and 49 whereby the hide frame is indexed one step forward, the roller 47 is forced against the first hide, as indicated in dotted lines, and the heads 49a are raised to disengage the hide from the pins 43. Said hide then drops so that it is draped over the roller 47 with its leading end between the hide supporting rod and clamps of the frame at the feed end of the machine. The released hide is pinned against the rollers 47 by the hides at the rear and this, together with the vertical plane of the hides being in advance of the axis of the roller 47 ensure that the hide will drape over the roller.

The operator then moves gear lever 56 to close switch 61 which energises the forward contactor 60 so that the conveyor, after a slight delay, moves in its forward direction. A roller 32 of the conveyor frame leaving station A will first open switch 1B so that the solenoid of valve 59 is de-energised. Valve 59 then functions to admit compressed air to the assemblies 51a and thereby raise the top rollers 50.

When the frame at the feed end commences its forward movement its levers 38 move clear of the stops 39 so that its clamps now clamp the leading end of the first hide to its hide supporting rod 34, the hide being then pulled forward with the frame. During this movement of the frame its rollers 32 pass between the plates 33 and 33a and then bear against the horizontal portions 33b of the tracks. It will be seen that the frame has now been swivelled to a horizontal position with the arms 31 and their rollers trailing. The rod 34 with the hide secured thereto now passes between the upper and lower rollers at station A. The hide secured to said rod is thereby trailed over and rests on the lower rollers 51 at station A. Prior to the rollers 32 entering the gap 33c the trailing arm of the double arm lever 38 co-operates with the stop 39a. The lever is thereby rocked and the clamps moved from the rod 34 to release the hide. When the rollers 32 enter the gap 33c the said frame swivels in a clockwise direction, one of its rollers tripping switch 1A and then closing switch 1C. Switch 1A when opened stops motor 52 so that the conveyor comes to rest and switch 1C when closed energises the solenoid of valve 59 through a contactor 59a, said valve then operating to cause the top rollers 50 to descend. The hide is now nipped between the top and bottom rollers of station A with its leading half draped over the right hand lower roller 57.

The operator now moves the gear lever 56 to close the switch 63 which, through the reverse contactor 62 reverses the motor 52 thereby moving the conveyor frame to the position wherein its rollers 32 contact with the abutments 33h. During such movements its levers 38 contact with the stops 39b and are moved thereby to cause the clamps 35 to move to a hide receiving position. The reverse movement of the conveyor is stopped by the switch 2A as above described and the switch 2B is closed to admit compressed air to the assemblies by which the hide frame is indexed and the next hide draped over the roller 47 preparatory to being clamped to the hide carrying rod of the conveyor frame now positioned at the feed end of the apparatus.

Meantime the motors 53 are driving the manually controlled reversible gear, said motors being manually switched on at the commencement of the operations. The gear lever 56 is then operated manually so that the hide at station A is fed backwards. When the lever is so operated it also operates to reverse the motor 52. The hair on the leading part of the hide is removed by the hair removing means *a* when the hide is being fed backwards. At the appropriate moment and while the leading half of the hide is still nipped between the rollers 50 and 51 the conveyor is again moved in its forward direction and the drive to the rollers reversed by the manual operation of the gear lever and the automatic closure of switch 61 by said gear lever. The trailing half of the hide which is draped over the left hand roller 51 and is now travelling upwards is subjected to the hair removing means. The leading edge of the hide now passes between the hide supporting rod and the clamps positioned therebelow. By reason of the delay action of the switch 61 the leading end of the hide will pass between the hide carrying rod and clamps of the conveyor frame at station A before the conveyor is started and when this occurs the clamps will clamp the hide to the hide-carrying rod, the levers 38 moving away from the stops 39b.

This conveyor frame with the hide will now pass to station B. In passing to station B the rollers 32 of said conveyor frame will co-operate with the inclined tracks 33j so that the frame will be again swivelled to a horizontal position and will thereafter bear on the horizontal track portions 33d. In doing so one of its rollers closes switch 1C to raise the rollers 50. The upper roller at station B is raised and lowered in unison with the upper rollers at station A and the rollers at the two stations are rotated in unison. Such operations at the two stations are controlled by the switches described with reference to station A. At the end of the reversal movement the rollers 32 co-operate with the abutments 33i. Further during such movement the levers 38 co-operate with the stops 39c to release the hide and with the stops 93d to cause the clamps to open to receive the leading edge of the hide, the hide being de-fleshed at station B by the same cycle of operations by which the hair was removed therefrom at station A.

When the gear lever is again operated to move the frame forwards its rollers 32 co-operate with the track sections 33f and 33g. The first section serves to damp any rocking movement of the frame. At the discharge end of the machine, while the frame is still travelling to the right the levers contact with the stops 39e and the frame swings in a clockwise direction to clear the stops. Thereafter, when the direction of travel of the frame is reversed its levers co-operate with stops 39e to release the de-haired and de-fleshed hide, the second track section serving to hold the frame against rocking movement when the levers and stops 39e co-operate to release the hide.

It will be understood that when a hide is being received at the feed end of the apparatus another hide is being processed at station A, another hide is being processed at station B and another hide, now de-haired and de-fleshed, is being released at the delivery end of the apparatus.

It will therefore be appreciated that the hides pass one after another through the apparatus without manhandling and that in their travel each hide is subjected to a hair-removing operation which is effective over the full area thereof and is thereafter subjected to a flesh-removing operation which is likewise effective over the full area.

Although the apparatus has been particularly described as applied to the removal of hair and flesh from the hides it will be understood that the apparatus may be adapted to perform only one of the said operations, or it may have one or more additional processing stations where one or more further processes may be effected. Further the invention may likewise be applied at any stage in tanning process and/or to any process or processes to which it may be desirable to subject the tanned hides.

In such modified or alternative constructions of machine in accordance with the invention the processing stations perform the desired operations of the hides.

It will be understood that any suitable means may be provided to remove the hair and flesh.

If desired the gear lever, in lieu of being operated manually, may be operated automatically. This may be done by means of electrical means controlled by a light sensitive cell on which is directed a light beam which is interrupted by a hide at a processing station.

What I claim is:

1. An apparatus for processing hides comprising an endless conveyor, a series of transverse hide supporting rods supported by said conveyor, clamping means for securing the edge of a hide to each rod in turn and at least one processing station positioned below the conveyor, each station comprising upper and lower feed rollers, means for intermittently driving the rollers in opposite directions, means for opening the rollers to permit each rod in turn to pass therebetween and means for processing the hides at each side of the rollers, the arrangement and construction being such that a hide can be clamped to each rod in turn, each rod with hide clamped thereto carried forwardly between the rollers of the processing station, which rollers are then closed, the leading edge of the hide released and the rollers driven to feed the hide backwards, the leading half of the material being then processed, and thereafter the drive of the rollers reversed, the other half of the hide processed and the leading edge of the hide or the like again clamped to the said rod so that the hide is again fed forwards by the conveyor to a further processing station or to a delivery station.

2. An apparatus as claimed in claim 1 wherein each hide supporting rod is carried by a conveyor frame extending transversely of and secured to the conveyor so as to be capable of a swivelling movement and wherein guide means are provided to swivel the frames so that the hide supporting rod of each conveyor frame in turn is positioned to receive the leading edge of a hide at the feed end of the machine and also at the processing station or stations and guided to pass between the rollers of the station or stations.

3. An apparatus as claimed in claim 1 provided with rails to receive a hide frame from which the hides are suspended, means to feed the frame forward step by step and means to disconnect the leading hide preparatory to it being clamped to a hide supporting rod.

4. An apparatus as claimed in claim 3 provided at its feed end with a roller which can be operated to bear on the leading suspended hide so that when the hide is released from the hide frame it is draped over the roller to be supported thereby in such position that its leading edge can be clamped to a hide supporting rod.

5. An apparatus as claimed in claim 3 provided with pneumatic piston and cylinder assemblies to index the hide frame, to disengage the leading hide from the hide frame, to move a roller against the leading hide so that when said hide is released it is draped over said roller with its leading end in a position to be secured to the hide carrying rod of the conveyor frame at the feed end, a solenoid operated valve controlling the passage of compressed air to said assemblies and a switch operated by the conveyor by which said solenoid is energised.

6. An apparatus as claimed in claim 1 having a reversible motor to drive the conveyor and to reverse the drive, at least one second motor, with reversible gear to drive the rollers at a processing station, and a gear lever by the operation of which the first motor and the reversible gear can be intermittently reversed.

References Cited in the file of this patent

UNITED STATES PATENTS

| | | |
|---|---|---|
| 1,751,464 | Beck | Mar. 25, 1930 |
| 1,869,472 | Freudenberg | Aug. 2, 1932 |
| 2,704,932 | McIlvin | Mar. 29, 1955 |